United States Patent Office 3,213,043
Patented Oct. 19, 1965

3,213,043
METHOD OF FOAMING OXIDIZED POLYETHYLENE
Clifton L. Kehr, Ednor, Md., assignor to W. R. Grace & Co., New York, N.Y., a corporation of Connecticut
No Drawing. Filed Aug. 29, 1963, Ser. No. 305,530
3 Claims. (Cl. 260—2.5)

This invention relates to the preparation of foams based on oxidized high density polyethylene.

In summary, the invention is directed to heating an oxidized high density polyethylene as a self-foaming base to a temperature of at least about 160° C., under pressure, and then releasing the pressure to substantially atmospheric pressure, followed by cooling the thus-foamed or expanded product.

Foams made from high density polyethylene are known in the art, and are generally prepared from a combination of polyethylene resin plus blowing agent.

The present invention makes use of an oxidized polyethylene resin which, as manufactured, contains its own "blowing agent."

By "oxidized polyethylene" is meant high density (0.940–0.970) polyethylene or copolymers of ethylene and other alpha-olefins such as propylene, butene-1, pentane-1, 3-methylbutene-1, 4-methylpentene-1, and the like wherein the density of the starting polymer is in the range 0.935 to 0.970, such as that prepared by the well-known Phillips or Ziegler processes, which has been heated in solid phase with free molecular oxygen (e.g., air) for a time sufficient to incorporate thereinto 0.5 to 5.0% oxygen by weight. The following example (Procedure A) illustrates the preparation of a typical oxidized polyethylene, suitable for use in this invention, and additional information as to synthesis of the starting oxidized polyethylene of this invention is contained in my co-pending application Ser. No. 202,105, filed June 13, 1962.

PROCEDURE A 80 grams of commercial polyethylene in flake form having a melt index of 0.0, a solution viscosity of 9.0, and a density of about 0.95 were spread out in an aluminum foil dish to a depth of approximately ¼ inch. The sample was placed in a Fisher Isotemp Forced-Draft oven which had been preheated to 128±2° C. At the end of 11 hours the sample was removed from the oven and quickly cooled to room temperature to quench the oxidation process by spreading the polymer out on the bench top. When the sample reached room temperature, it was placed in a pint jar and blended for about 8 minutes on a roller mill to assure maximum homogeneity.

If desired, the oxidation step can be carried out for longer times. For example, Procedure B consisting of essentially the same conditions and reagents of Procedure A, with the exception of an oxidation time of 21 hours, can be used to make the starting oxidized polyethylene.

During the manufacture of oxidized polyethylene, labile groups are built into the polymers. These labile groups are produced by the oxidation processes above described on the hydrocarbon chain of the original Phillips process polyethylene. Although it is thought all common oxygen-containing groups are produced, most oxygen present is in the form of ketone, hydroxyl, ester, carboxyl, ether, anhydride, and aldehyde groups.

These built-in labile groups are stable up to about 160–175° C. Above this temperature, however, $CO_2$ and water are evolved, serving as "built-in," non-migrating, compatible blowing agents for making foams. The main evolution of $CO_2$ and $H_2O$ is believed to result from dehydration and decarboxylation of hydroxyl and carboxylic acid or ester groups, respectively, present in the oxidized polymer.

The advantages of the chemically "built-in" blowing agents $CO_2$ and water are that they (1) are non-bleeding, non-exuding, non-subliming, and non-volatile; (2) leave no foreign or harmful residues after the blowing is completed; (3) involve no dispersion problems since they are polymer-soluble and polymer attached; (4) are compatible with the other functional groups in the polymeric chain and thus cause no harmful interactions; and (5) are non-toxic gases which also are non-flammable and non-corrosive.

The amount of gases evolved from the oxidized polyethylene may be enhanced or increased by the use of certain chemical reactions aimed at increasing the number of oxygen-containing groups on the oxidized polyethylene product of Procedures A and B.

This embodiment of the invention is useful in making certain types of foamed products, as will be explained. To get flexible, tough foams having still further improvements in density and cell size, oxidized polyethylene prepared by Procedure A or Procedure B can be treated with compounds serving to increase the number of carbonyl groups on the polymer, for example: said polymer can be reacted with carbon suboxide in a dispersion of toluene, acetone or other suitable inert solvent, followed by hydrolysis, in accordance with the following equation:

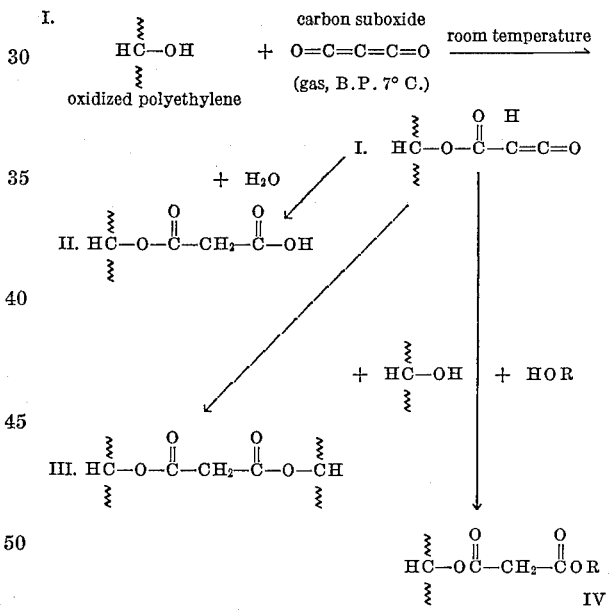

Alternate reagents such as succinic anhydride, maleic anhydride, or malonyl chloride with an acid acceptor such as pyridine, magnesium oxide or the like can be substituted for carbon suboxide.

In a static system using flake oxidized polyethylene, product I should predominate; however, some self-condensation to III may occur. It is probable that III would also decarboxylate, but at a higher temperature. In fact, using reaction IV, one might be able to adjust $CO_2$ evolution temperature and rate as desired by deliberately using various alcohols (as indicated) simply by variations in the structure of the —R group (primary to secondary to tertiary, etc.).

By using water, product II should be obtained. This type of malonic ester/acid decarboxylates at about 150–175° C. at a rapid rate and thus acts as an effective foaming agent.

The net result of the above described reactions is that (1) $CO_2$ evolution may be increased without chain scission, (2) the extent and rate of $CO_2$ evolution may be more closely controlled, (3) the density of the resultant foam may be reduced to an even greater extent than with treatment of said oxidized polyethylene.

The temperature at which the oxidized polyethylene is heated to cause foaming is fairly important. It should be at least 160° C., since below this temperature little or no foaming is obtained. Above 300° C., on the other hand, the material has a tendency to degrade. Accordingly the operable temperature range is substantially 160–300° C., and preferably 200°–250° C.

The pressure and time of heating are not critical. The function of pressure is simply to retain substantially all the gases released by heating, so that on pressure release the expansion of the gases will occur as tiny bubbles homogeneously throughout the polyethylene. There is obviously no upper limit on this pressure. The broad range for pressure is up to 1500 p.s.i., although pressures in the range of 50 to 750 p.s.i. are usually sufficient. The time of heating in general is simply the time required for the oxidized polyethylene to reach foaming temperature. This is simply a function of the heating efficiency of the mold and of the thickness of the material to be foamed and will obviously vary according to these circumstances. In general, heating times of the order of 5 seconds to 15 minutes are suitable. Longer times are of course operable, but are usually unnecessary.

The oxidized polyethylene to be foamed can be admixed with substantial amounts (up to about 90% by weight) of inert materials, such as plasticizers, pigments, fillers, polyethylene, polypropylene, and other polyolefins, and the like. Two or more different grades of oxidized polyethylene can also be admixed and foamed.

The following examples illustrate without limiting the invention.

*Example 1*

20 g. oxidized polyethylene flake prepared by Procedure A above was placed in a pressure mold 4" x 4" x ⅛". The sample was backed on both sides with polyethylene terephthalate film to contain the foamed product and to serve as parting aids on opening the mold. The sample was then heated at 200° C. and at 1000 p.s.i. for 10 minutes. The pressure was then released, whereon the sample immediately foamed and expanded to nearly twice its original thickness. The density of the foamed slab was 0.6 g./ml.

*Example 2*

The procedure of Example 1 was followed except that the mold was closed for only 1 minute. The foamed product was substantially the same as that made in Example 1.

*Example 3*

Oxidized polyethylene prepared by Procedure B above was mixed 50–50 with commerical 0.96 density unoxidized polyethylene in flake form and the mixture foamed by the procedure of Example 1. The resultant foam had a density of 0.6 g./ml.

I claim:
1. The method of foaming oxidized polyethylene comprising heating said oxidized polyethylene to a temperature of at least 160° C. under a pressure in excess of 50 pounds per square inch, then releasing the pressure to substantially atmospheric pressure, whereby the oxidized polyethylene foams and expands, and finally cooling this expanded foamed polyethylene.
2. The method according to claim 1 in which the oxidized polyethylene is in admixture with unoxidized polyethylene.
3. The method according to claim 1 in which the temperature is 160–300° C., the pressure is 50–1500 p.s.i., and the heating time is about 5 seconds to 15 minutes.

References Cited by the Examiner

Bobalek et al.: "Journal of Applied Polymer Science," vol. 2, pages 210–215, 1959.

MURRAY TILLMAN, *Primary Examiner.*